United States Patent [19]

Kiel

[11] Patent Number: 4,922,529
[45] Date of Patent: May 1, 1990

[54] AUTOMATIC HANGUP APPARATUS FOR RESTORING SERVICE TO OFF-HOOK TELEPHONES

[76] Inventor: David J. Kiel, 11107 Flowering Pear, Cupertino, Calif. 95014

[21] Appl. No.: 280,663

[22] Filed: Dec. 6, 1988

[51] Int. Cl.$^5$ ............................................. H04M 1/74
[52] U.S. Cl. .................................... 379/387; 379/424; 379/377
[58] Field of Search ............... 379/387, 373, 377, 375, 379/424

[56] References Cited

U.S. PATENT DOCUMENTS

3,150,237  9/1964  Baldik et al. ........................ 379/387

Primary Examiner—Stafford D. Schreyer
Attorney, Agent, or Firm—Robert K. Stoddard

[57] ABSTRACT

The hangup apparatus uses an inadvertent off-hook detector circuit designed to detect the off-hook "howler" alert signal transmitted to a telephone by the telephone company when the telephone has been off-hook for a period of time without any user activity. The detector circuit provides an automatic hangup signal to an automatically actuated hangup switch, disconnecting the telephone voice network from the telephone lines and restoring service to the telephone. One version of the invention can be incorporated into newly manufactured telephones, and another is suitable for use with existing telephones. Both versions can be realized using readily available commercial electronic components.

27 Claims, 4 Drawing Sheets

AUTOMATIC HANGUP APPARATUS FOR RESTORING SERVICE TO OFF-HOOK TELEPHONES

BACKGROUND OF THE INVENTION

The present invention relates generally to the field of telephones for use in telephone systems, more particularly to improving the serviceability of such telephones, and especially to ways of preventing the out-of-order status and consequent loss of incoming-call service whenever such telephones are inadvertently left off-hook.

Present-day telephones, whether of the traditional electromechanical sort or the more recently introduced electronic type, must be placed in an on-hook status in order to be able to receive an incoming call. That is, the voice network used during telephone conversation must be disconnected from the telephone lines such that the ringer circuit can respond to a ring signal by alerting the user either aurally or, sometimes, visually.

Such an on-hook status is traditionaly established by placing the telephone handset on a cradle when not in use. The cradle incorporates a switch which senses the presence of the handset and responds by disconnecting the voice network from the telephone lines. More recently introduced telephones often achieve the same on-hook status when the handset is laid down on a flat surface, or by some other manual means of operating the hookswitch to disconnect the voice network from the phone lines.

However, there are many instances when the telephone may be inadvertently left off-hook, resulting in the phone being placed in an out-of-order status as to incoming calls until the user discovers the problem and hangs up the telephone. Such instances occur frequently when young children or pets play with or jostle the telephone, when the user is called away from the telephone while waiting in a hold status and forgets to return, or simply when the phone is carelessly and improperly hung up such that the hookswitch fails to be actuated.

The problem of the off-hook telephone is familar to the companies which supply telephone service. In most localities supplied by such service, an off-hook alert signal in the form of a distinct audio tone or a set of audio tones is transmitted to a telephone left off-hook for a period of time without any user activity such as dialing or connection and conversation. This signal is fairly loud and is usually cycled on and off or warbled in frequency or volume such that a user who is nearby will hear it and be alerted to hang up the telephone.

However, the alert signal is usually terminated after a short period of time and the off-hook telephone is then silent. If the off-hook alert signal is transmitted at a time when the user is not near enough to the phone to hear it, or at a time when other environmental noises render the alert signal inaudible, the telephone can remain out of order for a long period of time.

Consequently, some other means for restoring service to a phone left off-hook would be highly desirable since it would make the phone more dependable. Considerable improvement in this regard would result from the provision of a signalling device which provides a more readily sensible signal indicating inadvertent off-hook status, such as a louder alarm, perhaps in combination with a flashing light. However, it would be preferable to automatically restore service to an off-hook phone without undue delay instead of merely attempting to alert the user to hang up the phone. Whatever means of coping with inadvertent off-hook status is chosen should be inexpensive to produce, capable of working with an existing phone or of incorporation into a new telephone design, and completely reliable.

DESCRIPTION OF THE PRIOR ART

U.S. Pat. No. 3,150,237 was issued on Sept. 22, 1964 to F. C. Baldik et al and covers an apparatus designed to clear an off-hook telephone from a party-line network. The apparatus utilizes an electromechanical relay switch which is mechanically coupled to the cradle switch. The relay switch can be actuated to disconnect an off-hook telephone from the telephone line, thus restoring service to other users of the party line.

However, as disclosed at col. 4, 11. 12–19, operation of the relay switch can occur only when the telephone company transmits a special signal to the offending telephone, operating the relay to disconnect the instrument. Consequently, the arrangements taught by this patent only have value if the proposed system for disconnecting an inadvertently off-hook telephone is adopted by the telephone companies.

SUMMARY OF THE INVENTION

An object of the present invention is to provide improved measures to aid in restoring service to an inadvertently off-hook telephone.

A further object of the present invention is to provide an apparatus which can be actuated to restore incoming-call service to a telephone which has been inadvertently left off-hook.

A further object of the present invention is to provide such an apparatus in a form which operates automatically without intervention from either the user or the telephone company.

A further object of the present invention is to provide such an apparatus in a form which is reliable in operation and inexpensive to manufacture.

A further object of the present invention is to provide such an apparatus in a form which is primarily electronic rather than electromechanical in nature.

A further object of the present invention is to provide such an apparatus in a form which can readily be constructed from commercially available electronic components.

A further object of the present invention is to provide such an apparatus in a form which can readily be integrated into a newly manufactured telephone.

A further object of the present invention is to provide such an apparatus in a form which can be separate from the telephone, such that the apparatus can be added to an existing telephone.

A further object of the present invention is to provide such an apparatus having the capability of determining when a signal condition indicative of inadvertent off-hook status exists.

A further object of the present invention is to provide such an apparatus having the capability of recognizing the off-hook alert signal transmitted by telephone companies to a telephone which has been left off-hook for a period of time.

To the above ends, an inadvertent off-hook telephone apparatus according to the present invention utilizes an inadvertent off-hook detector to determine whether the telephone has accidentally been left off-hook, and a transducer to alert the user or, preferably, to drive an automatically actuated hangup switch to disconnect the telephone voice network from the telephone lines, thus restoring normal incoming-call service. The inadvertent off-hook detector may base its determination on the existence of a dial tone for an excessive length of time, on the combination of off-hook telephone status together with line silence for an excessive period of time, or on the combination of off-hook telephone status together with a lack of motion of the telephone handset. However the best mode of detection of inadvertent off-hook status according to the present invention involves the detection of the distinctive off-hook alert signal transmitted by the telephone company to a telephone which has been off-hook for a period of time without any user activity such as dialing or connection and conversation.

Whichever mode of inadvertent off-hook detection is used, the inadvertent off-hook detector produces an automatic hangup signal whenever the determination of inadvertent off-hook status is made. The automatic hangup signal is coupled to the automatically actuated hangup switch and the telephone is restored to normal operation.

BRIEF DESCRIPTION OF THE DRAWING

The above and other features, objects and advantages of the present invention together with the best mode known to the inventor thereof for carrying out his invention will become more apparent from reading the following description of the invention while studying the associated drawing, the various figures of which represent.

DESCRIPTION OF THE PRESENT INVENTION

Figure 1:
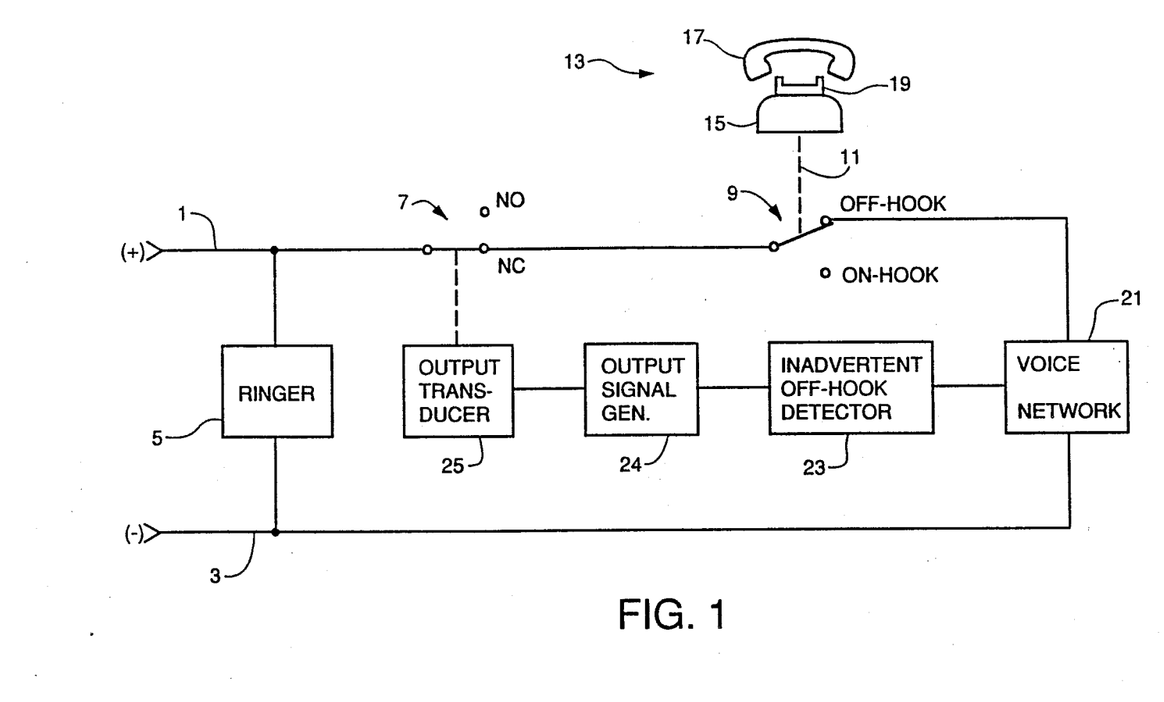
FIG. 1 is a block-schematic diagram of a telephone incorporating a generalized inadvertent off-hook apparatus according to the present invention.

FIG. 1 is a generalized block diagram illustrating an off-hook signal apparatus broadly embodying the concepts of the present invention for restoring service to an off-hook telephone. In FIG. 1 a pair of telephone lines, represented as "tip" line 1 and "ring" line 3 are shown, labeled (+) and (−) respectively, in accordance with standard telephone terminology. A ringer 5, which could be any of the known telephone ringer devices such as a bell or electronic signaling device, is connected across lines 1 and 3 and is responsive to a low-frequency audio ring signal when it appears on these lines.

Line 1 continues to the right in FIG. 1 through a normally closed automatic hangup switch 7 to a hookswitch 9. As symbolized by a dotted line 11, hookswitch 9 is actuated between its OFF-HOOK and ON-HOOK positions during normal operation of a telephone 13, which is symbolically illustrated in FIG. 1 in a traditional and well-known form. Telephone 13 consists of a base unit 15 and a handset 17. When telephone 13 is not in use, handset 17 is normally placed on a cradle 19 which forms a part of base unit 15 as is well known.

In this position, the weight of handset 17 depresses a button-actuator (not shown) located in cradle 19 and thereby moves hookswitch 9 to its ON-HOOK position. However, when the telephone user removes handset 17 from its rest position on cradle 19, hookswitch 9 moves to its OFF-HOOK position as illustrated in FIG. 1, connecting a voice network 21 to line 1.

The connection of voice network 21 across lines 1 and 3 causes a noticeable drop in DC resistance between these lines, allowing an increase in current which signals the off-hook status of telephone 13 to the telephone network equipment (not shown) which is connected to these lines, and causing a dial tone to be transmitted by this equipment over lines 1 and 3. Under conditions of normal operation, the user then dials his call and replaces handset 17 on cradle 19 at the end of the call, restoring hookswitch 9 to its ON-HOOK position in which only ringer 5 is connected between lines 1 and 3, ready to signal an incoming call.

If, however, handset 17 is not properly placed on cradle 19 such that hookswitch 9 is not restored to the ON-HOOK position, voice network 21 remains connected between lines 1 and 3. Under this condition, telephone 13 is not ready to receive an incoming call and is out-of-order until handset 17 is properly placed on cradle 19. The out-of-order status may not be noticed by a user for a considerable period of time, and in fact may not be discovered until the next time he places an outgoing call.

In accordance with the present invention, the loss of incoming call service occasioned by inadvertently leaving telephone 13 in an OFF-HOOK status when not in use can be avoided by providing an inadvertent off-hook detector 23, an output signal generator 24, and an output transducer 25. Detector 23, connected to voice network 21, senses one or more signal conditions therein which are indicative of whether an inadvertent off-hook status exists and makes a determination of this status. Output signal generator 24 responds by producing an output signal having a fist value when inadvertent off-hook status is determined not to exist and a second, different value when inadvertent off-hook status is determined to exist.

Output transducer 25 responds to the output signal from generator 24 by transiting to a first sensible response state if the output signal has the first value, and by transiting to a second sensible response state if the output signal has the second value. As examples, the first sensible response state could be the absence of an audible buzzer sound from transducer 25, or the failure to light a visible indicator lamp (not shown), while the second sensible response state could be the sounding of the buzzer or the lighting of the lamp. Either of these sensible responses could alert the user of the off-hook status of the telephone.

However, in accordance with the preferred embodiments of the present invention, the sensible response states of tranducer 25 are the non-actuation or actuation of automatic hangup switch 7 in response to the determination by detector 23 that inadvertent off-hook status does or does not, respectively, exist. In this way, output signal generator 24 and output transducer 25 taken together with switch 7 comprise an automatic hangup means which responds to the determination of off-hook status by detector 23 and cures this status automatically without intervention from the user. Accordingly, transducer 25 and switch 7 are preferably realized as an electrically or electronically actuated switch.

In such realizations of transducer 25, the output signal from generator 24 is used by transducer 25 to actuate automatic hangup switch 7, causing it to transit from its normally closed position (illustrated in FIG. 1) to its normally open position, thus disconnecting voice network 21 from lines 1 and 3 and restoring normal incoming call service to telephone 13. As will be apparent to those skilled in the art, such realizations of transducer 25 and switch 7 can in practice be in the form of an electromechanical relay, or in the form of any suitable known type of electronic switch.

The practical realization of detector 23 depends upon the nature of the signal condition which is considered to be indicative of inadvertent off-hook status of telephone 13. In this regard, several signal conditions which are useful as indicators of inadvertent off-hook status exist, and will be discussed briefly: (a) A dial tone which continues for an abnormally long time, such as one minute or so is usually an indication of obnormal operation, since the dial tone terminates as soon as dialing begins. (b) Similarly, silence on the line which continues for an abnormally long time with the telephone in an off-hook status may also be used as an indication of inadvertent off-hook status. (c) Another signal condition indicative of inadvertent off-hook status would be a lack of normal handset motion even though the telephone is in an off-hook status.

In accordance with the preceding, detector 23 could be realized in the form of a dial-tone detector together with a timer if signal condition (a) were to be used as the indication of inadvertent off-hook status. If signal condition (b) were to be used, detector 23 could be realized as a broad-bandwidth audio detector together with a timer circuit which is activated only in the absence of detected signal, and which resets both upon detected audio tones and whenever hookswitch 9 is in an ON-HOOK status. To detect signal condition (c), a motion detector could be incorporated in handset 17, such that the absence of signal from the motion detector when hookswitch 9 is in an OFF-HOOK status would be indicative of inadvertent off-hook status.

Each of these signal conditions and consequent realizations of detector 23 could be used to provide a satisfactory off-hook detector apparatus of the sort illustrated generally in FIG. 1, but each of them has some drawback which is believed to make it less than an optimum solution. Dial-tone detection together with a timer might be falsely triggered by a user who habitually picks up the handset while looking up a phone number. Similarly, the use of long silence on the line might result in an annoying disconnection of a user who was waiting on hold. Motion detection involves building a special motion transducer into the handset and would also require some means to avoid disconnecting a user who lays down the handset to look up information during a telephone conversation.

Accordingly, none of these alternatives can be considered as preferred realizations of the circuit of FIG. 1 and none of them will be discussed further in this patent application. The preferred signal condition indicative of inadvertent off-hook status of telephone 13 according to the present invention is the existence on lines 1 and 3 of a unique off-hook alert signal transmitted by telephone companies to a telephone which is left off-hook for a period of time without any user activity such as dialing or connection.

As mentioned in the "Background" section of this patent application, the off-hook alert signal used by various commercial suppliers of telephone service usually consists of a loud audio tone of either a single frequency or a composite of several frequencies, which may additionally include time-domain variations. Such time-domain variations may include the rapid cycling of the signal on and off or the warbling of the frequency or volume of the signal.

Figure 2:
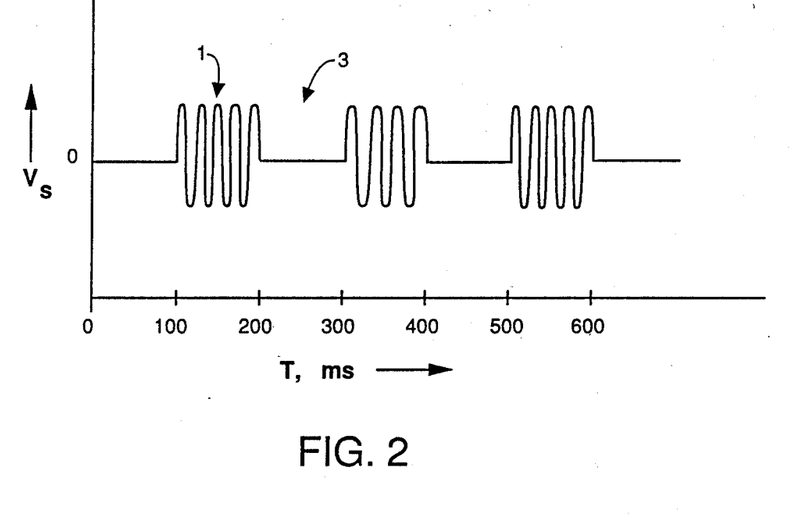
FIG. 2 is a voltage-time graph showing a conventional off-hook alert signal used by numerous telephone companies.

FIG. 2 is a graph of voltage versus time illustrating the "howler" type of off-hook alert signal currently in use by Bell System telephone companies in the U.S. The signal consists of 100 millisecond tone bursts such as brust 1 alternating with 100 ms. periods of no signal such as period 3. Considered purely in the frequency domain, the signal may be viewed as an alternating waveform having 100% amplitude modulation by a square wave having a period of 200 ms., or a frequency of 5 Hz. Alternatively, the signal may be considered as an alternating waveform with time-domain variation of the cyclical on-off type. The content of each tone burst has been illustrated simply in FIG. 2 as an alternating waveform, while the exact content will be made clear in the discussion of FIG. 3 which follows.

Such an off-hook alert signal is transmitted by the telephone company to any phone which has remained off-hook for a preselected period of time, such as 30 to 45 seconds, without any user activity such as dialing. It is designed to be distinctive and audible to a user in the vicinity of the telephone, alerting him to replace the receiver on the hook.

Figure 3:
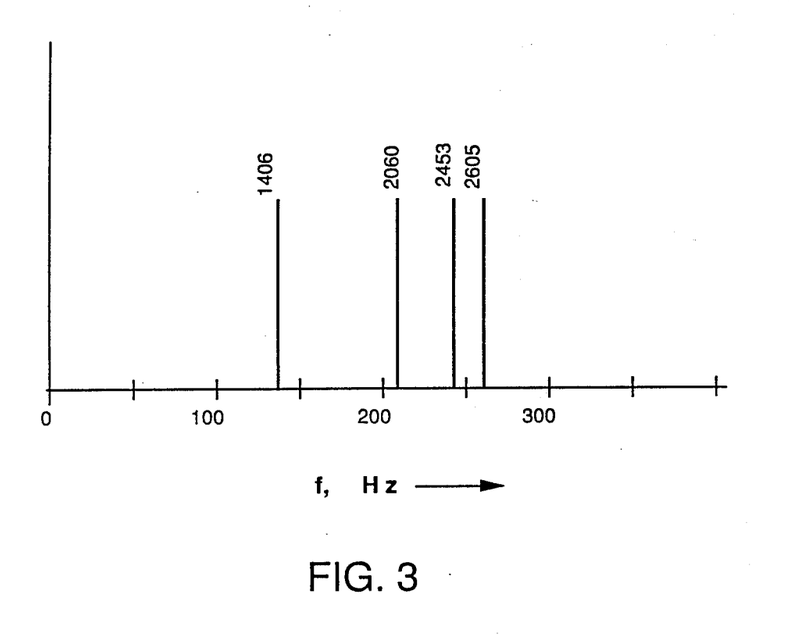
FIG. 3 is a frequency-spectrum graph showing the approximate frequencies used in the off-hook alert signal of FIG. 2.

FIG. 3 is a frequency-spectrum plot showing the four frequency components currently in use by Bell System telephone companies. As shown in FIG. 3, the four frequencies are approximately: 1406, 2060, 2453, and 2605 Hz. Each of these frequencies is gated on during the bursts illustrated in FIG. 2.

Figure 4:
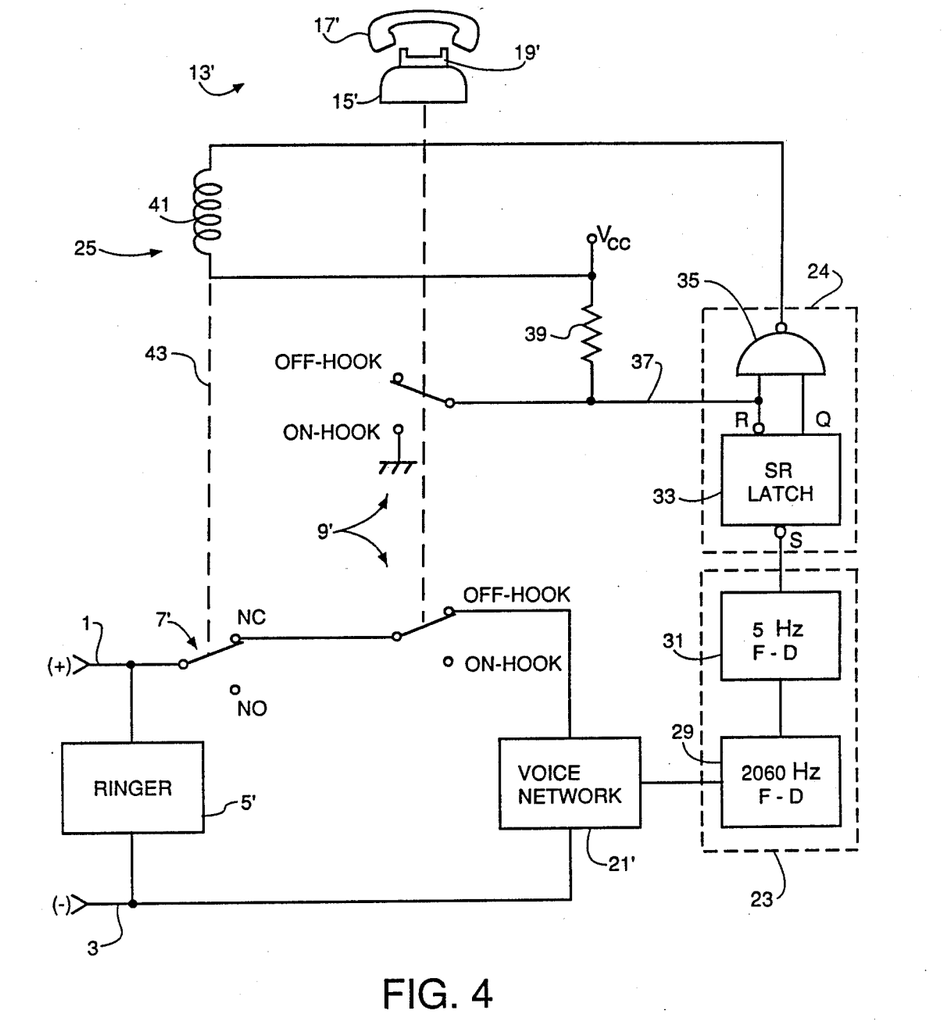
FIG. 4 is a block-schematic diagram of a telephone incorporating a preferred embodiment of the automatic hangup apparatus according to the present invention.

FIG. 4 illustrates in block-schematic form a telephone apparatus provided, according to the present invention, with an automatic hangup apparatus for responding to the off-hook alert signal of FIGS. 2 and 3. Primed reference numerals have been used in FIG. 4 where appropriate to indicate correspondence with the parts of FIG. 1. The telephone apparatus of FIG. 4 is representative of a telephone having an automatic hangup device according to the present invention integrally incorporated into it, as would be appropriate when using the teachings of the present invention in a newly manufactured telephone.

As in the case of FIG. 1, a ringer 5' is connected across lines 1 and 3. Line 1 extends through the normally closed contact of an automatic hangup switch 7' and the lower section of a DPDT (double-pole, double-throw) hookswitch 9' to a voice network 21'. Hookswitch 9', like its counterpart hookswitch 9 in FIG. 1, has been illustrated in the OFF-HOOK position, and telephone 13' is accordingly shown with its handset 17' lifted from the cradle 19' on telephone base 15'.

Inadvertent off-hook detector 23 has been illustrated in FIG. 4 as a dotted rectangle enclosing two circuit blocks: an audio bandpass filter and detector 29 connected to voice network 21 to receive incoming telephone audio signals, and a sub-audio bandpass filter and detector 31 connected to the logic output of filter-detector 29. Output signal generator 24 encompasses two circuit blocks also: an SR (set/reset) latch 33 connected to the logic output of sub-audio filter-detector 31, and a NAND circuit 35 connected to the R (reset) and Q (logic out) terminals of SR latch 33.

Filter-detector 29 may have a passband centered on one of the four audio frequencies shown in FIG. 3, or may be a multiple-section filter designed to trap 2, 3, or all 4 of the frequencies of the FIG. 3 signal. However, in the interest of simplicity and lowest cost, this filter-detector may best be designed to respond to only the 2060 Hz component, since this frequency is reasonably well-spaced from the others and lies above any of the signal frequencies currently used for dialing in the telephone system.

The logic output signal from filter-detector 29 changes state between 0 and 1 in response to the presence or absence of a signal input within the design frequency band. Consequently, the "howler" signal of FIG. 2, containing the 2060 Hz center frequency to which filter-detector 29 responds, causes the output of filter-detector 29 to be a 5 Hz square wave since 5 Hz is the repetition frequency of the tone bursts of FIG. 2.

Accordingly, sub-audio detector 31 may be designed to have a passband centered at 5 Hz, such that it provides a logic low output signal to SR latch 33 whenever it detects the characteristic 5 Hz repetition frequency of the signal of FIG. 2. By using two filter-detectors, one tuned to one of the component frequencies of the tone bursts and the other tuned to the anticipated time-domain variations of the signal, the off-hook alert signal can be identified with virtual certainty.

Filter-detectors 29 and 31 may each be conveniently realized, for example, using the commercially available LM567 tone decoder integrated circuit supplied by National Semiconductor Corporation. The resistive and capacitive circuit components needed to provide operation at frequencies such as 5 Hz and at the frequencies of FIG. 3 above are readily selectable from an examination of the data sheets on this integrated circuit. The LM567 circuit provides a logic output signal which remains high in the absence of detected signal within it passband, and which goes low when such signal is detected.

SR latch 33 may be conveniently realized, for example, using the commercially available SN74279 active-low quad S-R latch supplied by Texas Instruments. The SN74279 is well suited for use as latch 33 in combination with LM567 realization of filter-detectors 29 and 31, since the SN74279 has active low inputs, and therefore is compatible with the LM567's logic outputs.

The R input of SR latch 33 is also one of the inputs to NAND circuit 35, such that the output of NAND 35 can only go low (active) when R is high. A bias line 37 connects this input both to a bias resistor 39 which goes to a source (not shown) of positive voltage $V_{cc}$ such as approximately 5 volts DC, and to the upper section of hookswitch 9'.

When the telephone handset 17' is off-hook as shown, the voltage on line 37 and the R input of latch 33 is held high by resistor 39. However, if handset 17' is placed on cradle 19' and the upper section of hookswitch 9' is therefore ON-HOOK, line 37 is connected to ground as shown. In this condition, the voltage on line 37 and the R input of latch 33 is low.

The active-low output from NAND circuit 35 goes to the output transducer 25, realized as a relay coil 41 which actuates automatic hangup switch 7', as symbolized by dotted line 43. One end of coil 41 is connected to the output of NAND 35 while the other end connects to $V_{cc}$. Consequently, current will flow in coil 41 when the output of NAND 35 is low, causing automatic hangup switch 7' to switch to its normally open (NO) position, disconnecting voice network 21' from telephone line 1. At this point, the telephone is restored to a condition in which it is ready to signal incoming calls.

NAND circuit 35, which may be realized as an SN7438 integrated circuit from Texas Instruments, for example, provides ample current-sinking capacity to cope with the current from coil 41.

The logic relationships involved in the operation of the automatic hangup apparatus are summarized in the following truth table:

| S | R | Q | NAND | |
|---|---|---|------|---|
| H | L | L | H | (1) |
| L | H | H | L | (2) |
| H | H | (No Change) | L | (3) |
| L | L | H | H | (4) |

Line (1) of this table represents the initial condition in which the telephone is hung up (on hook) and there is, consequently, no alert signal. Under these circumstances, S is high because filter-detectors 29 and 31 detect no signal, while R is low because the upper section of hookswitch 9' is ON-HOOK, connecting line 37 to ground. The Q output of latch 33 is low, and the output from NAND 35 is high.

Line (2) is representative of the condition in which the telephone has been inadvertently left off-hook for a sufficient time such that the off-hook alert signal is present. Under this circumstance, S has become low because both filter-detectors 29 and 31 have detected the alert signal and the output of filter-detector 31 has consequently gone low. R is high because of the OFF-HOOK condition of hookswitch 9'. Consequently, Q is also high, and with both of its inputs (R and Q) high, NAND 35 is low. The low output from NAND 35 causes current to flow in coil 41, actuating automatic hangup switch 7' to its normally open position. Voice coil 21 and inadvertent off-hook detector 23 are thus effectively isolated from lines 1 and 3, and ringer 5' can signal any incoming calls.

Line (3) of the truth table represents the stable condition which normally follows the condition discussed above in regard to line (2). The only change is caused by the fact that the off-hook alert signal is no longer reaching filter-detectors 29 and 31, since automatic hangup switch 7' is in its normally open position. Therefore, the S input to latch 33 has gone to high. However, latch 33 has remained latched with its Q output still high, and the telephone is still off-hook, causing R to be high. Consequently, the output of NAND 35 is still low, causing current in coil 41 to maintain switch 7' in its normally open position.

The Q output in line (3) of the truth table has been labeled (No Change) to indicate that it will have the same value as in the condition which immediately preceded the condition displayed in line (3). Thus, as indicated in the preceding paragraph, Q will be high if the preceding condition is the one summarized in line (2). However, if the preceding condition was the one summarized in line (1), as it would be if the user lifted the handset to place an outgoing call, then Q would be low and NAND would be high, thus avoiding automatic hangup.

Line (4) of the truth table has been included for completeness, but does not represent a possible condition, since it requires that the off-hook alert signal be presented to filter-detectors 29 and 31 (S low), under the condition that the telephone is on-hook (R low). With the telephone on-hook, the lower section of hookswitch 9' is in its ON-HOOK position, effectively isolating the inadvertent off-hook detector 23 from any alert signal which might still be present on lines 1 and 3.

The provision of a double-pole hookswitch 9' in FIG. 4 permits the automatic hangup apparatus to self-reset whenever handset 17' is replaced on cradle 19', since the upper section of hookswitch 9' is used to provide a logic signal indicative of OFF-HOOK or ON-HOOK status to the R (reset) input of SR latch 33. Thus, after automatic hangup switch 7' has transited to its normally open position as detailed above, the telephone apparatus is in a stable operative condition to signal incoming calls by means of ringer 5'. However, receiver 17' is off-hook without any connection of voice network 21' to lines 1 and 3 because of the open circuit resulting from the position of switch 7'.

Resetting of automatic hangup switch 7' is accomplished when the user, in response to the signal from ringer 5', momentarily hangs up handset 17' or depresses the button actuator in cradle 19'. This causes hookswitch 9' to momentarily transit to its ON-HOOK position, pulling the R input of latch 33 to ground or logic low. Consequently, in accordance with line (1) of the truth table, Q goes low and the output of NAND 35 goes high, current in coil 41 ceases, and automatic hangup switch 7' returns to its normally closed position. Now when the handset is lifted from cradle 19', the voice network 21' is connected across lines 1 and 3 and normal conversation can ensue.

Figure 5:
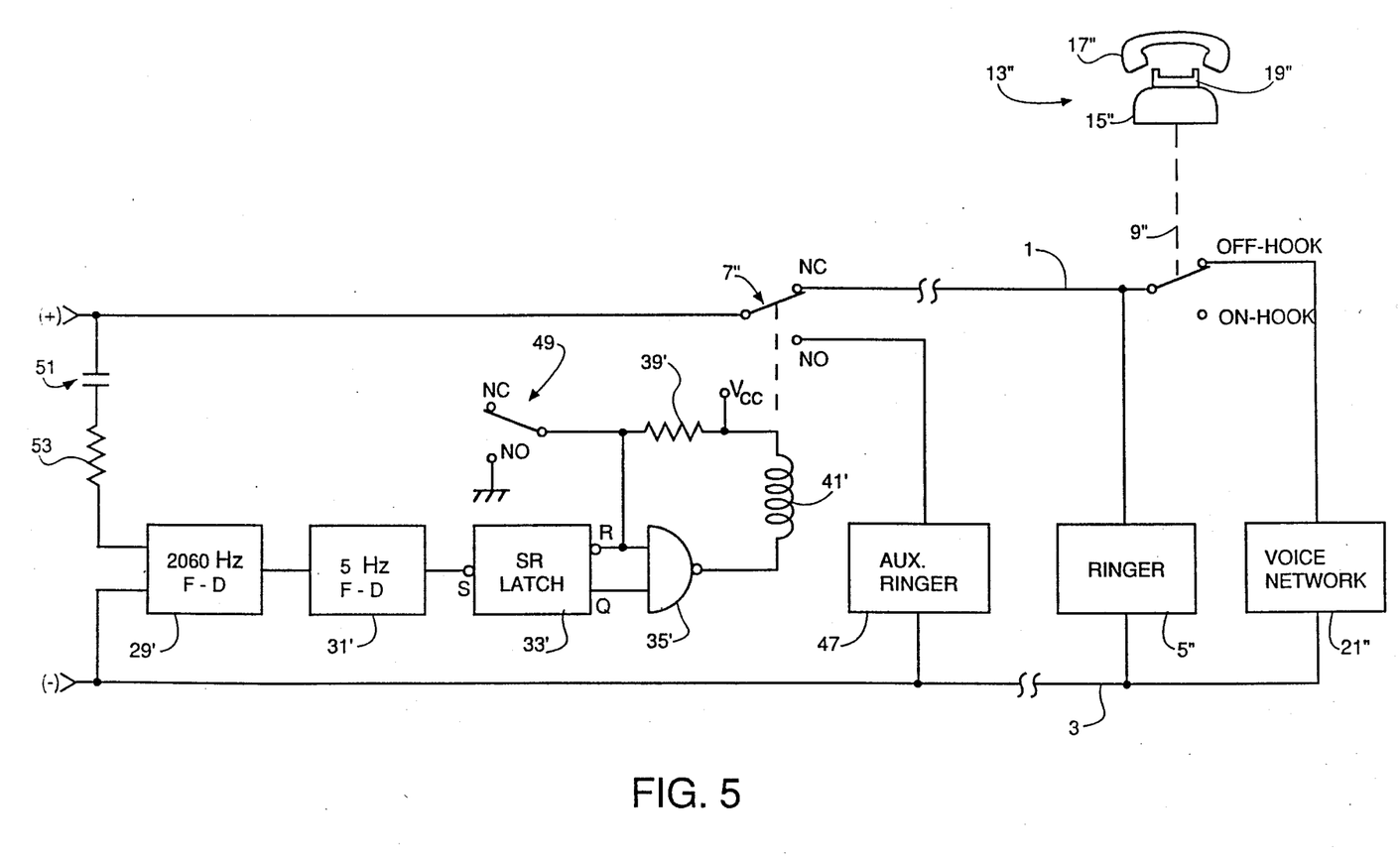
FIG. 5 is a block-schematic diagram of a preferred embodiment of the automatic hangup apparatus according to the present invention used with an existing telephone.

FIG. 5 illustrates an alternative embodiment of the invention of this application which is useful for providing an automatic hangup capability to an existing telephone. Doubly primed reference numerals have been used to indicate parts which correspond to equivalent parts of the embodiments of FIGS. 1 and 4. The existing telephone includes a handset 17" and a telephone base 15" including a cradle 19".

As before, dotted line 11" indicates that the removal of handset 17" from cradle 19" operates a hookswitch 9" and causes it to transit to its OFF-HOOK position (illustrated) in which voice network 21" is connected to lines 1 and 3. A ringer 5" is connected across lines 1 and 3 and is operative when hookswitch 9" is in its ON-HOOK position.

An automatic hangup apparatus 45 according to the present invention is also connected to lines 1 and 3 but may be housed outside the telephone apparatus itself. Apparatus 45 includes an audio filter-detector 29' tuned to one or more of the audio frequencies of FIG. 3 as in the case of the embodiment of FIG. 4, a sub-audio filter-detector 31' tuned to 5 Hz, an SR latch 33', and a NAND circuit 35'. The output of NAND 35' is used to drive a relay coil 41' as in FIG. 4, while the R input of SR latch 33' is held normally high by a bias resistor 39' connected to $V_{cc}$.

As in the case of FIG. 4, coil 41' actuates an automatic hangup switch 7", causing switch 7" to transit to its normally open position, disconnecting line 1 from the telephone. However, in the FIG. 5 embodiment, switch 7" also connects an auxiliary ringer 47 across lines 1 and 3 to provide a ring signal when an incoming call is present. A reset switch 49 having its normally open (NO) contact connected to circuit ground is provided to permit manual resetting of apparatus 45 after it has been activated by an inadvertent off-hook condition.

Since filter-detector 29' is directly connected to lines 1 and 3 instead of being connected through a hookswitch as in the case of FIG. 4, a filter-attenuator in the form of a capacitor 51 and resistor 53 have been provided to prevent most of the normal ring signal from reaching the input of filter-detector 29'. Although the ring signal may reach peak voltages of several hundred volts, its frequency is in the range of 20 to 50 Hz, more than 5 octaves below the 2060 Hz passband frequency of filter-detector 29'.

Consequently, the ring signal can be adequately attenuated by the simple filtering action of a single capacitor 51 which may have a value of 0.01 microfarad and a 500 volt rating, for example, when using the LM567 integrated circuit as filter-detector 29'. Resistor 53 attenuates the input to filter-detector 29' at all frequencies and may have a value of 125 kOhm, for example.

The operation of the automatic hangup apparatus 45 of FIG. 5 is very similar to the operation of FIG. 4, with the exceptions that inadvertent off-hook detection is performed by directly filtering and detecting any off-hook alert signal present on lines 1 and 3. Since the hangup apparatus 45 is located outside the telephone itself, there is no opportunity to position automatic hangup switch 7" to disconnect the voice network 21" without disconnecting ringer 5". Consequently, an auxiliary ringer 47 must be provided.

The use of a manual reset switch 49 as shown and described above is an appropriate low-cost solution if automatic hangup apparatus 45 is to be located in the immediate vicinity of the telephone. However, if apparatus 45 were located remotely from the telephone, such as at the point where lines 1 and 3 enter a junction box or modular wall jack, then the circuit of FIG. 5 could be modified by substituting a somewhat more complex resetting circuit which senses the on-hook status of the telephone by the resistance present between lines 1 and 3, for example.

Further, although the embodiments of FIGS. 4 and 5 of this application have been designed to respond to the off-hook alert signal of FIGS. 2 and 3 with a high degree of certainty, it will be understood by those skilled in the art that simplifications could be made in the interest of reducing cost. For example, sub-audio detector-filter 31 or 31' could be left out of the circuit if detection of one of the FIG. 4 frequencies was felt to be an adequate indication of the presence of an off-hook alert signal.

Similarly, the off-hook alert signal could be very adequately characterized purely by its time-domain variations, such as the 5 Hz on-off cycling frequency used in the signal illustrated in FIG. 2 or other time-domain variations such as low frequency modulation or warbling of either frequency or amplitude.

It will also be understood that off-hook alert signals different from the one detailed in FIGS. 2 and 3 will require somewhat different realizations of inadvertent off-hook detector 23. For example, telephone systems using a single-frequency off-hook alert signal could be handled by a realization of detector 23 using a single filter-detector in combination with a timer.

Accordingly, although this invention has been described with some particularity in reference to embodiments thereof which, taken together, comprise the best mode known to the inventor for carrying out his invention, many changes could be made and many alternative embodiments could thus be derived without departing from the scope of the invention. Consequently, the scope of the invention is to be determined only from the following claims.

I claim:

1. An automatic telephone hangup apparatus for use with a telephone connected to the telephone lines of a telephone system of the type which provides an audible off-hook alert signal which is characterized by containing at least one prearranged identifying frequency to warn the user that his telephone has been left off-hook, wherein the telephone has a voice network and a hookswitch, and wherein the hookswitch is connected between the voice network and the telephone lines so as to connect the voice network to the telephone lines when the hookswitch is closed, and so as to disconnect the voice network from the telephone lines when the hookswitch is open, said automatic telephone hangup apparatus comprising:

frequency-discriminating off-hook alert signal detecting means for coupling to said telephone lines for detecting signals within a pass band including said identifying frequency and for generating in response thereto an automatic hangup signal;

automatic hangup means for coupling to said telephone and to said alert signal detecting means, for responding to said automatic hangup signal by disconnecting said voice network from said lines.

2. The apparatus of claim 1 wherein said identifying frequency is a frequency component of said off-hook alert signal and wherein said frequency discriminating signal detecting means comprises frequency characterizing means for recognizing said frequency component.

3. The apparatus of claim 1 wherein said identifying frequency is a sub-audio modulating frequency which produces time-domain variations of said off-hook alert signal, and wherein said signal detecting means comprises time-domain characterizing means for recognizing said time-domain variations.

4. The apparatus of claim 1 wherein said automatic hangup means comprises:

output signal generator means coupled to said off-hook alert signal detecting means for responding to said automatic hangup signal by producing an output signal having: (1) a first value when said automatic hangup signal does not exist, and (2) a second value different from said first value when said automatic hangup signal exists;

automatic hangup switching means for coupling to said telephone, said automatic hangup switching means being coupled to said output signal generator means for responding to said output signal by disconnecting said voice network from said telephone lines when said output signal has said second value.

5. The apparatus of claim 1 wherein said frequency-discriminating off-hook alert signal detecting means comprises:

a first bandpass filter-detector having a passband including said identifying frequency for producing a detector signal having a fist logic value when said signal component is present and a second logic value when said signal component is not present.

6. The apparatus of claim 3 wherein said time-domain characterizing means comprises:

a second bandpass filter-detector having a passband including said modulation frequency for producing a second detected signal having a first logic value when said modulation frequency is not present and a second logic value when said modulation frequency is present.

7. The apparatus of claim 1 wherein said automatic hangup means comprises:

latching means for causing said voice network, once disconnected by said automatic hangup means, to remain disconnected until reset; and, reset means coupled to said latching means for resetting said automatic hangup switching means to thereby reconnect said voice network and telephone lines.

8. An inadvertent-off-hook signal apparatus for use with a telephone connected to a telephone system, wherein the telephone has: (a) a voice network for transmission and reception of audio signals on the telephone lines of the telephone system; (b) a hookswitch which connects the voice network to the telephone lines when the hookswitch is in a closed, off-hook position and which disconnects the voice network from the telephone lines when the hookswitch is in an open, on-hook position; and (c) a signalling device connected across the telephone lines for producing a sensible signal indicative of an incoming telephone call; said inadvertent-off-hook signal apparatus comprises:

inadvertent-off-hook signal detecting means for coupling to said telephone for determination of whether a signal condition indicative of inadvertent off-hook status exists;

output signal generator means coupled to said inadvertent-off-hook signal detecting means for responding to said determination of signal condition by producing an output signal having: (1) a first value when said inadvertent off-hook status does not exist, and (2) a second value different from said first value when said inadvertent off-hook status exists, said output signal accordingly assuming said first or said second value in response to said determination of signal condition; and, output transducer means coupled to said output signal generator means and having a first sensible response state corresponding to said output signal having said first value, and having a second sensible response state corresponding to said output signal having said second value, said output transducer means responding to said output signal by transiting from said first state to said second state whenever said output signal transits between said first and second values.

9. The apparatus of claim 8 wherein said output signal generator means further includes:

latching means for causing said output signal, after inadvertent off-hook status has been determined to exist, to remain at said second value until reset; and, reset means coupled to said output signal generator means for resetting said output signal to said first value.

10. The apparatus of claim 8 wherein said output transducer means comprises:

automatic hangup switching means for coupling to said telephone, said automatic hangup switching means being coupled to said output signal generator means for responding to said output signal by disconnecting said voice network from said telephone lines when said output signal has said second value;

latching means coupled to said automatic hangup switching means for causing said voice network, once disconnected by said automatic hangup switching means, to remain disconnected until reset; and, reset means coupled to said automatic hangup switching means for resetting said automatic hangup switching means to thereby reconnect said voice network and telephone lines.

11. The apparatus of claim 8 wherein the telephone system is of the type which transmits an off-hook alert signal to a telephone left off-hook for a preselected period of time without any user activity, and wherein said inadvertent-off-hook signal detecting means comprises:

off-hook alert signal detecting means for determining the presence or absence of said off-hook alert signal, and wherein said signal condition indicative of inadvertent off-hook status is the presence of said off-hook alert signal on said telephone lines.

12. The apparatus of claim 11 wherein said off-hook alert signal includes a signal component having a characteristic frequency, and wherein said off-hook alert signal detecting means comprises frequency-sensitive means for recognizing said signal component.

13. The apparatus of claim 11 wherein the off-hook alert signal includes time-domain variations, and wherein said signal detecting means comprises time-domain characterizing means for recognizing said time-domain variations.

14. The apparatus of claim 12 wherein said frequency-sensitive means comprises:

a first bandpass filter-detector having a passband including said characteristic frequency for producing a detector signal having a first logic value when said signal component is present and a second logic value when said signal component is not present.

15. The apparatus of claim 13 wherein said time-domain variations comprises modulation of said off-hook alert signal at a modulation frequency, and wherein said time-domain characterizing means comprises:

a second bandpass filter-detector having a passband including said modulation frequency for producing a second detected signal having a first logic value when said modulation frequency is not present and a second logic value when said modulation frequency is present;

said output signal generator being coupled to said second bandpass filter-detector and responding to said second detected signal by producing said output signal first value when said second detected signal has said first logic value, and by producing said output signal second value when said detected signal has said second logic value.

16. The apparatus of claim 15 wherein said output transducer means comprises:

automatic hangup switching means for coupling to said telephone, said automatic hangup switching means being coupled to said output signal generator means for responding to said output signal by disconnecting said voice network from said telephone lines when said output signal has said second value;

latching means coupled to said automatic hangup switching means for causing said voice network, once disconnected by said automatic hangup switching means, to remain disconnected until reset; and, reset means coupled to said automatic hangup switching means for resetting said automatic hangup switching means to thereby reconnect said voice network and telephone lines.

17. The apparatus of claim 16 wherein said latching means comprises:

an SR latch circuit having a set terminal S, a reset terminal R, and a logic output terminal Q, said S terminal being coupled to said second bandpass filter, said R terminal being coupled to said reset means, and said Q terminal being coupled to said automatic hangup switching means.

18. The apparatus of claim 17 wherein said output signal generator further comprises:

NAND circuit means coupled between said latch means and said automatic hangup switching means to logically NAND the Q and R terminal voltages and to supply the NANDed result to said automatic hangup switching means.

19. In a telephone apparatus including a telephone adapted for connection to the telephone lines of a telephone system of the type which provides an audible off-hook alert signal which is characterized by containing at least one prearranged identifying frequency to warn the user that his telephone has been left off-hook, wherein the telephone has: (a) a voice network for transmission and reception of audio signals on the telephone lines of the telephone system; (b) a hookswitch connected between the voice network and the telephone lines so as to connect the voice network to the telephone lines when the hookswitch is closed, and so as to disconnect the voice network from the telephone lines when the hookswitch is open; and (c) a signalling device connected across the telephone lines for producing a sensible signal indicative of an incoming telephone call, the improvement comprising an automatic telephone hangup apparatus coupled to said telephone, said automatic telephone hangup apparatus comprising:

frequency-discriminating off-hook alert signal detecting means coupled to said telephone lines for detecting signals within a pass band including said identifying frequency and for generating in response thereto an automatic hangup signal; and, automatic hangup means, coupled to said telephone and to said alert signal detecting means, for responding to said automatic hangup signal by disconnecting said voice network from said lines.

20. The apparatus of claim 19 wherein said off-hook alert signal detecting means is coupled to said telephone lines by being connected to said hookswitch to cause said off-hook alert signal detecting means to be connected to said telephone lines when said hookswitch is closed and to cause said off-hook alert detecting means to be disconnected from said telephone lines when said hookswitch is open.

21. The apparatus of claim 19 wherein said off-hook alert signal detecting means is adapted for direct connection to said telephone lines, said automatic hangup apparatus further comprising:

auxiliary signalling means for producing a sensible signal indicative of an incoming telephone call, and wherein said automatic hangup means connects said auxiliary signalling means to said telephone lines when said automatic hangup means disconnects said voice network.

22. The apparatus of claim 21 wherein said identifying frequency is a frequency component of said off-hook alert signal and wherein said frequency-sensitive signal detecting means comprises frequency characterizing means for recognizing said frequency component.

23. The apparatus of claim 21 wherein said identifying frequency is a sub-audio modulating frequency which produces time-domain variations of said off-hook alert signal, and wherein said signal detecting means comprises time-domain characterizing means for recognizing said time-domain variations.

24. The apparatus of claim 21 wherein said automatic hangup means comprises:
output signal generator means coupled to said off-hook alert signal detecting means for responding to said automatic hangup signal by producing an output signal having: (1) a first value when said automatic hangup signal does not exist, and (2) a second value different from said first value when said automatic hangup signal exists; and,
automatic hangup switching means for coupling to said telephone, said automatic hangup switching means being coupled to said output signal generator means for responding to said output signal by disconnecting said voice network from said telephone lines and by connecting said auxiliary signalling means to said telephone lines when said output signal has said second value.

25. The apparatus of claim 19 wherein said frequency-discriminating off-hook alert signal detecting means comprises:
a first bandpass filter-detector having a passband including said identifying frequency for producing a detector signal having a first logic value when said identifying frequency is present and a second logic value when said identifying frequency is not present.

26. The apparatus of claim 23 wherein said time-domain characterizing means comprises:
a second bandpass filter-detector having a passband including said modulation frequency for producing a second detected signal having a first logic value when said modulation frequency is not present and a second logic value when said modulation frequency is present.

27. The apparatus of claim 22 wherein said automatic hangup means comprises:
latching means for causing said voice network, once diconnected by said automatic hangup means, to remain disconnected until reset; and,
reset means coupled to said latching means for resetting said automatic hangup switching means to thereby reconnect said voice network and telephone lines.

* * * * *